(12) United States Patent
Nakayama (10) Patent No.: US 10,503,191 B2
(45) Date of Patent: Dec. 10, 2019

(54) ENERGY MANAGEMENT APPARATUS AND ENERGY MANAGEMENT METHOD

(71) Applicant: KYOCERA Corporation, Kyoto-shi, Kyoto (JP)

(72) Inventor: Taku Nakayama, Yamato (JP)

(73) Assignee: KYOCERA Corporation, Kyoto (JP)

( * ) Notice: Subject to any disclaimer, the term of this patent is extended or adjusted under 35 U.S.C. 154(b) by 562 days.

(21) Appl. No.: 15/111,769

(22) PCT Filed: Jan. 13, 2015

(86) PCT No.: PCT/JP2015/050696
§ 371 (c)(1),
(2) Date: Jul. 14, 2016

(87) PCT Pub. No.: WO2015/108041
PCT Pub. Date: Jul. 23, 2015

(65) Prior Publication Data
US 2016/0327971 A1      Nov. 10, 2016

(30) Foreign Application Priority Data

Jan. 14, 2014 (JP) .................................. 2014-004667

(51) Int. Cl.
*G01M 1/38* (2006.01)
*G05B 13/00* (2006.01)
(Continued)

(52) U.S. Cl.
CPC .............. *G05F 1/66* (2013.01); *G05B 15/02* (2013.01); *H02J 3/00* (2013.01); *G05B 2219/2614* (2013.01); *Y02P 80/11* (2015.11)

(58) Field of Classification Search
CPC ... G05B 15/02; G05B 2219/2614; G05F 1/66; H02J 3/00; Y02P 80/11
See application file for complete search history.

(56) References Cited

U.S. PATENT DOCUMENTS

2002/0082924 A1   6/2002   Koether
2003/0176213 A1*  9/2003   LeMay ................... G07F 17/32
                                                463/20
(Continued)

FOREIGN PATENT DOCUMENTS

JP        2005-502112 A     1/2005
JP        2003-035447 A     7/2009
(Continued)

OTHER PUBLICATIONS

International Search Report and Written Opinion of the International Searching Authority issued by the Japanese Patent Office for International Application No. PCT/JP2015/050696.

*Primary Examiner* — Zhipeng Wang
(74) *Attorney, Agent, or Firm* — Procopio Cory Hargreaves and Savitch LLP (57) ABSTRACT

A server electric power management apparatus 40 comprises a controller 43 configured to instruct multiple pieces of equipment 10 to use a first operation pattern for controlling the equipment 10, so as to achieve a desired operation result by mutual cooperation of the multiple pieces of equipment 10. The controller 43 changes the operation pattern used in the multiple pieces of equipment 10 from the first operation pattern to a second operation pattern, when a target equipment to be stopped is stopped. the second operation pattern is an operation pattern controlling the multiple pieces of equipment 10 other than the target equipment to be stopped to allow an operation result achieved by the mutual cooperation of the multiple pieces of equipment other than the target equipment to be stopped to approach to a desired operation result.

11 Claims, 8 Drawing Sheets

(51) Int. Cl.
*G05B 15/00* (2006.01)
*G05D 23/00* (2006.01)
*G05F 1/66* (2006.01)
*H02J 3/00* (2006.01)
*G05B 15/02* (2006.01)

(56) References Cited

U.S. PATENT DOCUMENTS

| | | | |
|---|---|---|---|
| 2006/0153068 A1* | 7/2006 | Dally | H04L 1/22 370/219 |
| 2012/0016526 A1* | 1/2012 | Burton | G05D 23/1931 700/278 |

FOREIGN PATENT DOCUMENTS

| | | |
|---|---|---|
| JP | 2009-174851 A | 8/2009 |
| JP | 2012-172912 A | 9/2012 |
| JP | 2013-096589 A | 5/2013 |

* cited by examiner

ENERGY MANAGEMENT APPARATUS AND ENERGY MANAGEMENT METHOD

TECHNICAL FIELD

The present invention relates to an energy management apparatus and an energy management method that manage energy consumption of equipment.

BACKGROUND ART

In recent years, energy management systems (EMS) that manage energy consumption of equipment have attracted public attention. Examples of such energy management systems include a home energy management system (HEMS), a building energy management system (BEMS), a factory energy management system (FEMS), and a store energy management system (SEMS).

A technique for scheduling maintenance of equipment in accordance with the operational situations of the equipment has been proposed. Specifically, the maintenance is scheduled by avoiding a peak period of operation of the equipment (see, e.g., Patent Literature 1).

Multiple pieces of equipment may operate by cooperating with each other to achieve a desired operation result. Air conditioning equipment, for example, may include multiple pieces of equipment which cooperate with each other to achieve a desired room temperature.

However, a desired operation result may not be achieved if any one of the multiple pieces of equipment is stopped due to maintenance, malfunction, or the like, and the normal operation mode is still continued.

CITATION LIST

Patent Literature

Patent Literature 1: Japanese application publication No. 2005-502112

SUMMARY OF INVENTION

A first aspect is abstracted as an energy management apparatus for managing multiple pieces of equipment installed in a consumer facility, comprising: a controller configured to control the multiple pieces of equipment by using a first operation pattern to achieve a desired operation result by mutual cooperation of the multiple pieces of equipment, wherein when a target equipment to be stopped among the multiple pieces of equipment is stopped during the use of the first operation pattern, the controller changes an operation pattern to be used for the control of the multiple pieces of equipment from the first operation pattern to a second operation pattern, the second operation pattern is an operation pattern controlling the multiple pieces of equipment other than the target equipment to be stopped to allow an operation result achieved by the mutual cooperation of the multiple pieces of equipment other than the target equipment to be stopped to approach to the desired operation result.

A second aspect is abstracted as, in the first aspect, the controller changes the operation pattern from the first operation pattern to the second operation pattern when a piece of the equipment, which needs to use the first operation pattern, is stopped during the execution of the first operation pattern because of a reason other than being controlled by the first operation pattern.

A third aspect is abstracted as, in the first aspect, the controller sets the second operation pattern in accordance with a position of the target equipment to be stopped in a space where the multiple pieces of equipment are disposed.

A fourth aspect is abstracted as, in the third aspect, the controller controls a piece of the equipment from among the multiple pieces of equipment differently between the first operation pattern and the second operation pattern, the piece of the equipment being disposed close to the target equipment to be stopped.

A fifth aspect is abstracted as, in any one of the aspects 1 to 4, the controller sets the second operation pattern in accordance with a purpose of use associated to the target equipment to be stopped in a space where the multiple pieces of equipment are disposed.

A sixth aspect is abstracted as, in the fifth aspect, the controller controls a piece of the equipment from among the multiple pieces of equipment differently between the first operation pattern and the second operation pattern, the piece of the equipment having the same use as the target equipment to be stopped.

A seventh aspect is abstracted as, in any one of the aspects 1 to 4, the consumer facility is a store, and the controller sets the second operation pattern in accordance with a kind of sales floor associated to the target equipment to be stopped in a space where the multiple pieces of equipment are disposed.

An eighth aspect is abstracted as, in the fifth aspect, the controller controls a piece of the equipment from among the multiple pieces of equipment differently between the first operation pattern and the second operation pattern when the piece of the equipment has the same kind of sales floor as the target equipment to be stopped.

A ninth aspect is abstracted as, in any one of the aspects 1 to 6, the controller acquires information representing a suspension period in which the target equipment to be stopped is stopped, and changes the second operation pattern to the first operation pattern during the suspension period.

A tenth aspect is abstracted as, in any one of the aspects 1 to 7, the multiple pieces of equipment are pieces of air conditioning equipment.

An eleventh aspect is abstracted as an energy management method for managing multiple pieces of equipment installed in a consumer facility, comprising: a step α of controlling the multiple pieces of equipment by using a first operation pattern to achieve a desired operation result by mutual cooperation of the multiple pieces of equipment, and a step β of changing an operation pattern to be used in controlling the multiple pieces of equipment from the first operation pattern to a second operation pattern, when a target equipment to be stopped among the multiple pieces of equipment is stopped during the use of the first operation pattern, wherein the second operation pattern controlling the multiple pieces of equipment other than the target equipment to be stopped to allow an operation result achieved by the mutual cooperation of the equipment other than the target equipment to be stopped to approach to the desired operation result.

DESCRIPTION OF EMBODIMENTS

An energy management system according to embodiments will be described below by referring to the accompanying drawings. In the drawings, the same or similar parts are indicated by the same or similar reference signs.

The drawings are illustrated schematically, and dimensional ratio and other variables differ from those of actual measurements. The actual measurements or the like, therefore, should be determined by referring to the following description. Needless to say, the drawings have different relationships or ratios of measurements.

Overview of Embodiments

An energy management apparatus according to embodiment manages multiple pieces of equipment installed in a consumer facility. The energy management apparatus comprises a controller configured to control the multiple pieces of equipment by using a first operation pattern to achieve a desired operation result by mutual cooperation of the multiple pieces of equipment. When a target equipment to be stopped among the multiple pieces of equipment is stopped during the use of the first operation pattern, the controller changes an operation pattern to be used for the control of the multiple pieces of equipment from the first operation pattern to a second operation pattern, the second operation pattern is an operation pattern controlling the multiple pieces of equipment other than the target equipment to be stopped to allow an operation result achieved by the mutual cooperation of the multiple pieces of equipment other than the target equipment to be stopped to approach to the desired operation result.

The energy management apparatus of the embodiments changes its operation pattern from the first operation pattern to the second operation pattern in response to a halt of operation of a target equipment to be stopped. This eliminates the situation where the desired operation result cannot be achieved due to the halt of any one of the multiple pieces of equipment.

First Embodiment (Energy Management System)

An energy management system according to a first embodiment will be described below.

Figure 1:
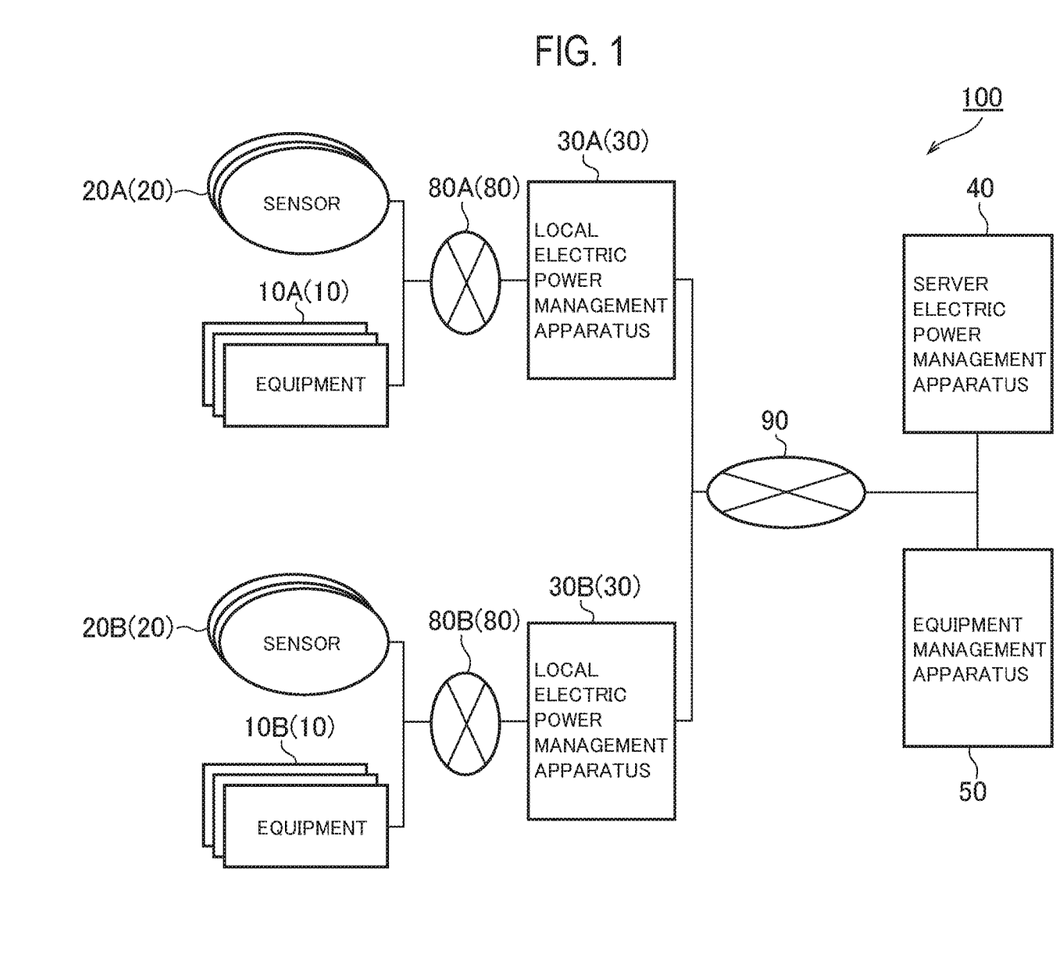
FIG. 1 illustrates an energy management system 100 according to a first embodiment.

As illustrated in FIG. 1, an energy management system 100 includes multiple pieces of equipment 10, a plurality of sensors 20, a plurality of local electric power management apparatuses 30, a server electric power management apparatus 40, and an equipment management apparatus 50. The energy management system 100 is provided in, for example, a consumer facility such as a retail store.

The first embodiment mainly illustrates a system for managing electric power as an example of the energy management systems. The embodiment, however, is not limited to this, and the energy management system 100 may also manage other energy than electric power (e.g., gas). The words "electric power", as used herein, may be replaced by "energy".

The equipment 10 consumes energy such as electric power or gas. Examples of the equipment 10 include air conditioners, lighting apparatuses, and cooling cases. For example, equipment 10A is installed in a facility A and equipment 10B is installed in a facility B. The facilities A and B are run, for example, by the same group of companies funded by the same financial group.

In the first embodiment, the equipment 10 may include pieces of equipment 10 that can be controlled automatically and pieces of equipment 10 that cannot be controlled automatically, which will be described later. The automatic control of the equipment 10 is a process to control an accumulated value of the power consumption so as not to exceed a predetermined threshold value (target value) for each facility during a predetermined time period (e.g., 30 minutes). Alternatively, the automatic control of the equipment 10 may also be a process to automatically control the power consumption of the equipment 10 to prevent the sum of the power consumption from exceeding the predetermined threshold value (target value).

The sensors 20 detect information necessary for managing the equipment 10. The sensors 20 may be electric sensors, for example, that detect power consumption of the equipment 10. When the equipment 10 includes air conditioners, the sensors 20 function as temperature sensors or humidity sensors that detect external temperatures or humidity, respectively, in a space (area) or facilities where the air conditioners are installed. When the equipment 10 includes lighting apparatuses, the sensors 20 function as illuminance sensors that detect illuminance of a space (area) where the lighting apparatuses are installed. When the equipment 10 includes cooling cases, the sensors 20 function as temperature sensors that detect temperatures in the cooling cases. The sensors 20A are installed, for example, in the facility A, and the sensors 20B may be installed in the facility B.

The local electric power management apparatuses 30 individually manage the equipment 10 connected therewith via a LAN 80. Specifically, each local electric power management apparatus 30 is connected to the equipment 10 and the sensors 20 via the LAN 80, and manages the power consumption of the equipment 10 in accordance with the information detected by the sensors 20. For example, a local electric power management apparatus 30A is installed in the facility A to manage the equipment 10A connected via the LAN 80A. A local electric power management apparatus 30B is installed in the facility B to manage the equipment 10B connected via the LAN 80B.

In the first embodiment, the local electric power management apparatuses 30 individually control the operation pattern of the equipment 10 in accordance with a control signal received from the server electric power management apparatus 40.

The server electric power management apparatus 40 is connected to each of the local electric power management apparatuses 30 via a WAN 90 and manages the power consumption of the equipment 10 via the local electric power management apparatuses 30. Specifically, the server electric power management apparatus 40 manages the multiple pieces of equipment 10 that cooperate with each other. The server electric power management apparatus 40 instructs the multiple pieces of equipment 10 to use an operation pattern (hereinafter referred to as a first operation pattern) for controlling the equipment 10, so as to achieve a desired operation result by mutual cooperation of the multiple pieces of equipment 10.

The multiple pieces of equipment 10 that cooperate with each other are, for example, air conditioners that are installed in the same facility to adjust room temperatures of predetermined areas. Alternatively, the multiple pieces of equipment 10 that cooperate with each other are, for example, cooling cases that are installed on the same sales floor to adjust temperatures of the cooling cases in predetermined areas.

The desired operation result is previously set by, for example, a user. The desired operation result of air conditioners provided as the equipment 10 is, for example, to achieve a room temperature closer to a desired room temperature by using the air conditioners. Alternatively, the desired operation result of cooling cases provided as the equipment 10 is, for example, to achieve a room temperature closer to a desired room temperature of the cooling cases.

The equipment management apparatus 50 manages maintenance information of the equipment 10. The maintenance information represents a history of replacement, maintenance, or the like of the equipment 10, or a schedule for replacement, maintenance, or the like of the equipment 10. The maintenance information is registered by a maintenance agent who is in charge of the maintenance of the equipment 10.

(Energy Management Apparatus)

An energy management apparatus according to the first embodiment is described below. The server electric power management apparatus 40 is an example of the energy management apparatus, as illustrated in FIG. 2.

Figure 2:
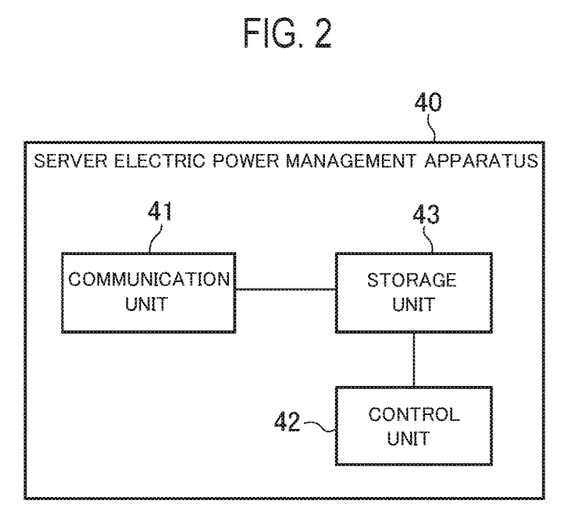
FIG. 2 illustrates a server electric power management apparatus 40 according to the first embodiment.

As illustrated in FIG. 2, the server electric power management apparatus 40 includes a communication unit 41, a storage unit 42, and controller 43.

The communication unit 41 is a communication module that communicates via the WAN 90. The communication unit 41 receives operation states of the equipment 10 and information detected by the sensors 20 from the local electric power management apparatus 30. The communication unit 41 transmits a control signal for controlling the operation of the equipment 10 to the local electric power management apparatus 30.

The storage unit 42 stores information received from the local electric power management apparatus 30. For example, the storage unit 42 cumulatively stores the power consumption of the equipment 10. Alternatively, the storage unit 42 stores a control history (such as a history of control signals) for the equipment 10.

The controller 43 manages the server electric power management apparatus 40. For example, the controller 43 instructs each of the multiple pieces of equipment 10 to use an operation pattern (hereinafter referred to as a first operation pattern) for controlling the equipment 10, so as to achieve a desired operation result by mutual cooperation of the multiple pieces of equipment 10. Specifically, the controller 43 instructs the multiple pieces of equipment 10 to use the first operation pattern by instructing the communication unit 41 to transmit a control signal representing the first operation pattern.

The controller 43 of the first embodiment changes the operation pattern used in the multiple pieces of equipment 10 from the first operation pattern to a second operation pattern, when any one piece of equipment 10 of the multiple pieces of equipment 10 provided as the target equipment is stopped. The second operation pattern controls the multiple pieces of equipment 10 other than the target equipment to be stopped, so as to achieve the operation result closer to the desired operation result by the mutual cooperation of the equipment 10 excluding the target equipment to be stopped.

The operation pattern may represent how to divide the multiple pieces of equipment 10 into groups. Alternatively, the operation pattern may represent a setting ability of each of the equipment 10. Alternatively, the operation pattern may represent a period to turn on the multiple pieces of equipment 10 in controlling (or rotationally controlling) the multiple pieces of equipment 10 that belong to the same group to be turned on sequentially.

The controller 43 preferably acquires information representing the suspension period, in which the target equipment to be stopped stops its operation, and changes in the suspension period the first operation pattern to the second operation pattern and the second operation pattern to the first operation pattern. For example, the controller 43 may change the first operation pattern to the second operation pattern at the timing when the suspension period starts, and change the second operation pattern to the first operation pattern at the timing when the suspension period ends. The suspension period is registered in the equipment management apparatus 50 such that the controller 43 can acquire the suspension period from the equipment management apparatus 50. The controller 43 may acquire (identify) the suspension period in accordance with the operation state of the equipment 10 received from the local electric power management apparatus 30.

In the first embodiment, the second operation pattern may be set in the following manners.

Firstly, the multiple pieces of equipment 10 are divided into groups in accordance with the positions of the multiple pieces of equipment 10. In this case, the controller 43 may set the second operation pattern in accordance with the position of the target equipment to be stopped in a space including the multiple pieces of equipment 10. Specifically, the controller 43 identifies peripheral groups formed in the periphery of the group including the target equipment to be stopped, in accordance with the position of the target equipment to be stopped. The controller 43 sets the second operation pattern for increasing the setting ability of the multiple pieces of equipment 10 that belong to the peripheral groups compared to the first operation pattern. Alternatively, the controller 43 sets the second operation pattern for allowing the multiple pieces of equipment 10 that belong to the peripheral groups into the group including the target equipment to be stopped. In this case, the multiple pieces of equipment 10 having been incorporated into the peripheral group is excluded from the peripheral groups.

Secondly, the multiple pieces of equipment 10 each have a purpose of use associated thereto in accordance with the positions of the multiple pieces of equipment 10 in the space including the equipment 10. In this case, the controller 43 changes the second operation pattern in accordance with the purpose of use associated to the target equipment to be stopped. Specifically, the controller 43 sets the second operation pattern for increasing the setting ability of the multiple pieces of equipment 10 that belong to the peripheral groups compared to the first operation pattern, when there are stringent requirements in the operation result to be achieved by the mutual cooperation of the multiple pieces of equipment 10 for the purpose of use associated to the target equipment to be stopped. Alternatively, the controller 43 sets the second operation pattern for allowing a piece of equipment 10 of the peripheral group to be incorporated into the group including the target equipment to be stopped, when there are stringent requirements in the operation result to be achieved by the mutual cooperation of the multiple pieces of equipment 10 for the purpose of use associated to the target equipment to be stopped. In this case, the multiple pieces of equipment 10 having been incorporated into the peripheral group is excluded from the peripheral groups. Meanwhile, the controller 43 sets the second operation pattern for excluding the target equipment to be stopped from the group including the target equipment to be stopped, when there are less stringent requirements in the operation result to be achieved by the mutual cooperation of the equipment 10 for the purpose of use associated to the target equipment to be stopped.

Thirdly, the multiple pieces of equipment 10 that belong to the same group are sequentially turned on (rotational control). In this case, the controller 43 sets the second operation pattern so as to compensate for insufficient ability during a period in which the target equipment to be stopped should have been turned on by extending a period for turning on other equipment 10 that belongs to the group including the target equipment to be stopped.

(Operation Pattern)

An operation pattern according to the first embodiment is described below.

In one example, a plurality of air conditioners is installed in a store in a mutually cooperating manner. Such air conditioners have an operation pattern as described below. The air conditioners are divided into groups. Each of the air conditioners has a purpose of use associated thereto in accordance with positions of the air conditioners arranged in a space (store) where the air conditioners are installed.

Specifically, the equipment 10 includes air conditioners #1-1 and #1-2, air conditioners #2-1 and #2-2, air conditioners #3-1 to #3-4, air conditioners #4-1 to #4-3, and air conditioners #5-1 to #5-3, as illustrated in FIGS. 3 to 13.

Figure 3:
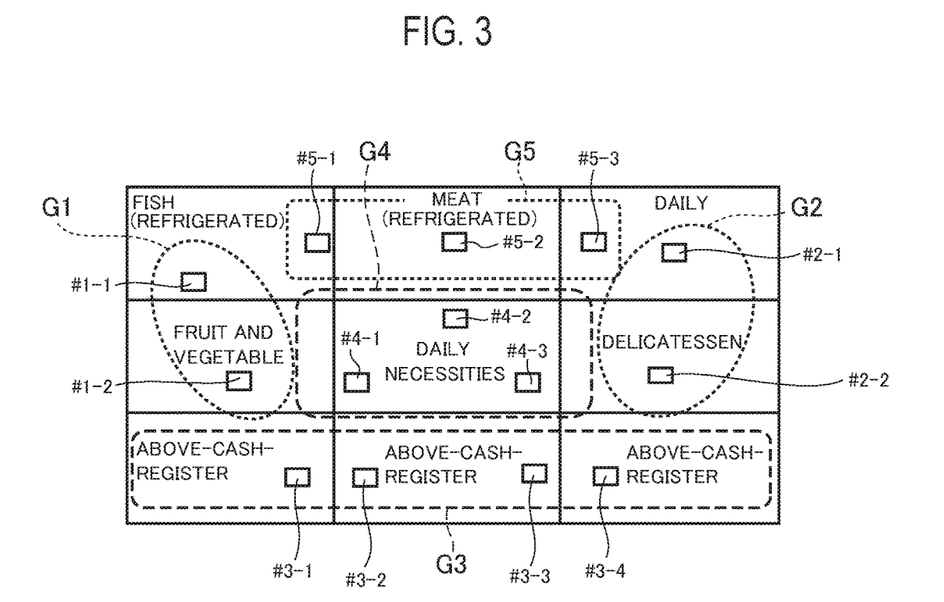
FIG. 3 explains an operation pattern according to the first embodiment.

The air conditioners #1-1 and #5-1 are used to control a room temperature of a "fish" area. The air conditioner #5-2 is used to control a room temperature of a "meat" area. These air conditioners in the "fish" and "meat" areas demand stringent requirements in their operation results (control results of the room temperatures) achieved by the mutual cooperation of the air conditioners, because the fish and meat products need refrigeration.

The air conditioners #2-1 and #5-3 are used to control a room temperature of a "dairy" area. The air conditioner #1-2 is used to control a room temperature of a "fruit and vegetable" area. The air conditioner #2-1 is used to control a room temperature of a "delicatessen" area. These air conditioners in the dairy, fruit and vegetable, and delicatessen areas may demand less stringent requirements in the operation result (control result of the room temperature) than in the fish and meat areas achieved by the mutual cooperation of the air conditioners.

The air conditioners #4-1 to #4-3 are used to control a room temperature of a "daily necessities" area. The air conditioners in the daily necessities area may demand less stringent requirements than in the dairy, fruit and vegetable, and delicatessen areas in their operation result (control result of the room temperature) achieved by the mutual cooperation of the air conditioners.

The air conditioners #5-1 to #5-3 are used to control a room temperature in an "above-cash-register" area. The air conditioners in the above-cash-register area may demand less stringent requirements than in the daily necessities area in their operation result (control result of the room temperature) achieved by the mutual cooperation of the air conditioners.

(First Operation Pattern)

In the first operation pattern, the air conditioners are divided into groups to achieve the desired operation result by the mutual cooperation of air conditioners. Specifically, the air conditioners #1-1 and #1-2 form a group G1, the air conditioners #2-1 and #2-1 form a group G2, the air conditioners #3-1 to #3-4 form a group G3, the air conditioners #4-1 to #4-3 form a group G4, and the air conditioners #5-1 to #5-3 form a group G5.

The grouped air conditioners individually have an optimized setting ability (temperature setting). Desired operation results (temperature settings) are predetermined according to factors such as target power consumption, maintenance of quality of products, or quality of life (QoL).

For example, the temperature setting differs for each group of air conditioners. In groups G1, G2, and G5, the air conditioners that belong to the same group operate simultaneously to prioritize the control of the room temperature. In groups G3 and G4, the air conditioners that belong to the same group are controlled to be sequentially turned on (rotational control).

(Second Operation Pattern A)

Figure 4:
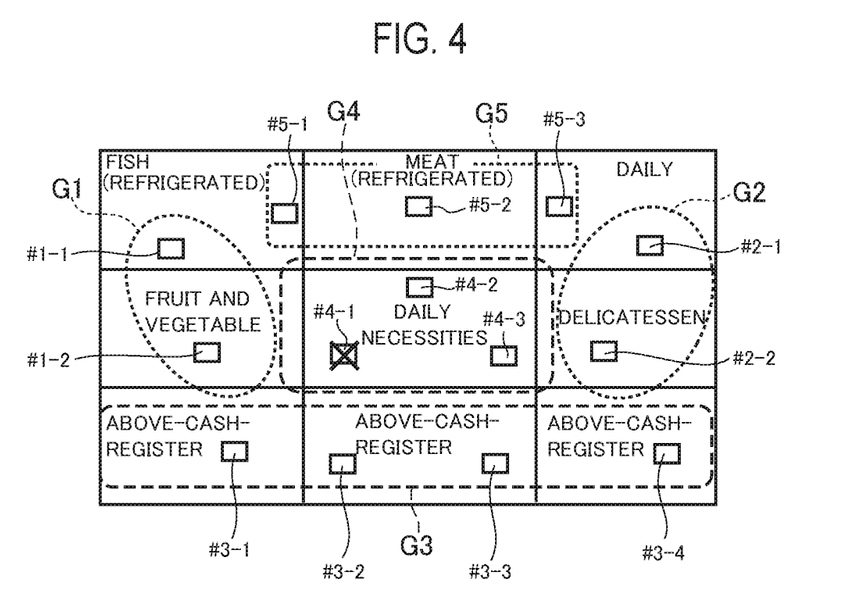
FIG. 4 explains an operation pattern according to the first embodiment.

In one example, a second operation pattern A stops operation of the air conditioner #4-1 (the target equipment to be stopped) during execution of the first operation pattern, as illustrated in FIG. 4. A suspension period for stopping the air conditioner #4-1 may be acquired from the equipment management apparatus 50 or from the operation state of the equipment 10 received from the local electric power management apparatus 30.

Figure 5:
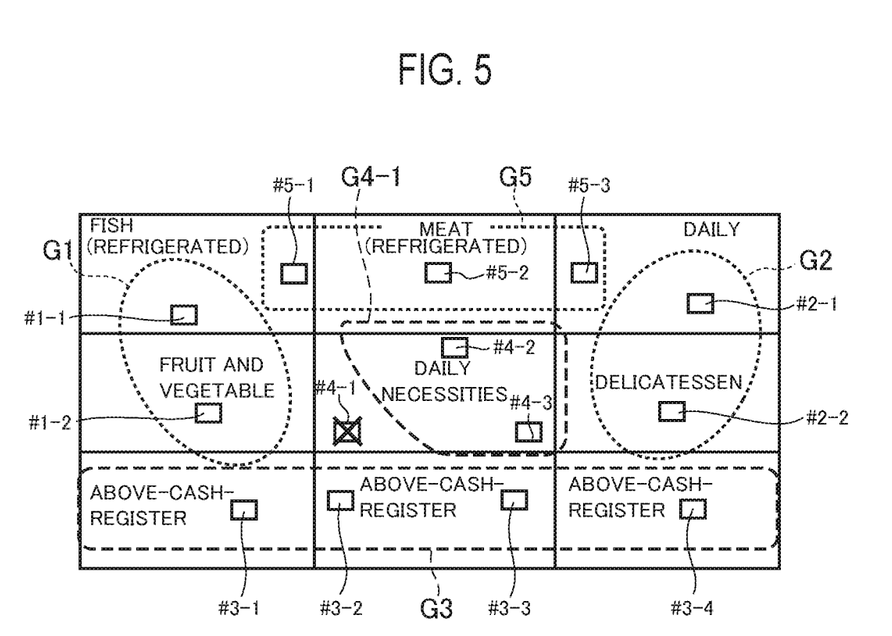
FIG. 5 explains an operation pattern according to the first embodiment.

The server electric power management apparatus 40 identifies the purpose of use (i.e., the daily necessities area) associated to the air conditioner #4-1. The server electric power management apparatus 40 sets the second operation pattern A for excluding the air conditioner #4-1 from the group G4 which includes the air conditioner #4-1, as illustrated in FIG. 5, because the air conditioners in the daily necessities area demand less stringent requirements in the operation result (temperature setting) achieved by the mutual cooperation of the air conditioners. A new group G4-1 is formed in the second operation pattern A.

The server electric power management apparatus 40, therefore, may acquire the information representing the suspension period to stop operation of the air conditioner #4-1, change the first operation pattern to the second operation pattern A at a timing when the suspension period starts, and change the second operation pattern A to the first operation pattern at a timing when the suspension period ends.

(Second Operation Pattern B)

Figure 6:
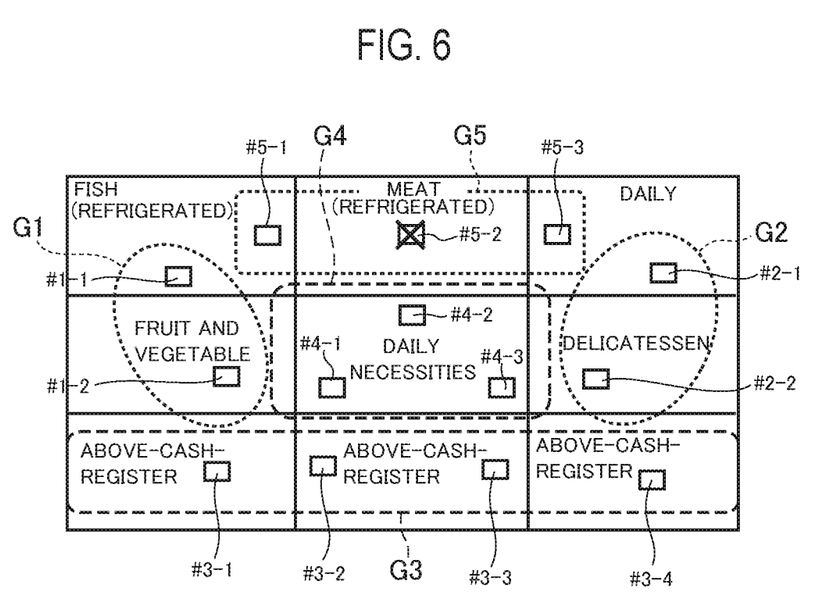
FIG. 6 explains an operation pattern according to the first embodiment.

In one example, a second operation pattern B stops operation of the air conditioner #5-2 (the target equipment to be stopped) during execution of the first operation pattern, as illustrated in FIG. 6. The suspension period of the air conditioner #5-2 may be acquired, as described above, from the equipment management apparatus 50 or from the operation state of the equipment 10 received from the local electric power management apparatus 30.

Figure 7:
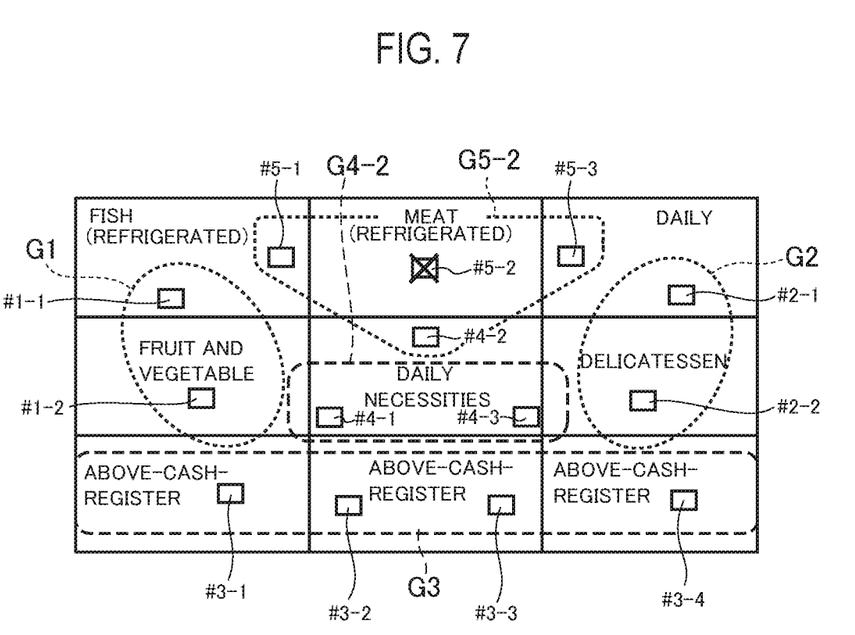
FIG. 7 explains an operation pattern according to the first embodiment.

The server electric power management apparatus 40 identifies the purpose of use (i.e., the meat area) associated to the air conditioner #5-2. The server electric power management apparatus 40 identifies a peripheral group (which is herein the group G4) provided on the periphery of the group including the air conditioner #5-2 in accordance with the location of the air conditioner #5-2. The server electric power management apparatus 40 sets the second operation pattern B for allowing the air conditioner #4-2 that belongs to the group G4 to be incorporated into the group G5, as illustrated in FIG. 7, because the air conditioners in the meat area demand stringent requirements in the operation result (temperature setting) achieved by the mutual cooperation of the air conditioners. The air conditioner #4-2 that belongs to the group G4 is excluded from the group G4. Thus, the groups G4-2 and G5-2 are renewed in the second operation pattern B.

The server electric power management apparatus 40 then identifies peripheral groups (which are herein the groups G1 and G2) provided on the periphery of the group including the air conditioner #5-2 in accordance with the position of the air conditioner #5-2. The server electric power management apparatus 40 changes the setting ability (temperature setting) of the air conditioners #1-1 and #2-1 included in the groups G1 and G2, respectively, to compensate for the decreased room temperature control function in accordance with the halt of operation of the air conditioner #5-2. The server electric power management apparatus 40 decreases the temperature setting of the air conditioners #1-1 and #2-1 to be lower than the temperature setting in the first operation pattern, because the meat area requires refrigeration.

Although the setting ability (temperature setting) of the air conditioners that belong to the group G5-2 may be changed, the air conditioners in the group G5-2 have large load and it is preferable to change the setting ability (temperature setting) of the air conditioners that belong to the peripheral groups in accordance with the halt of operation of the air conditioner #5-2.

Thus, the server electric power management apparatus 40 acquires the information representing the suspension period in which the air conditioner #5-2 is stopped, changes the first operation pattern to the second operation pattern B at the timing when the suspension period starts, and changes the second operation pattern B to the first operation pattern at the timing when the suspension period ends.

(Second Operation Pattern C)

Figure 8:
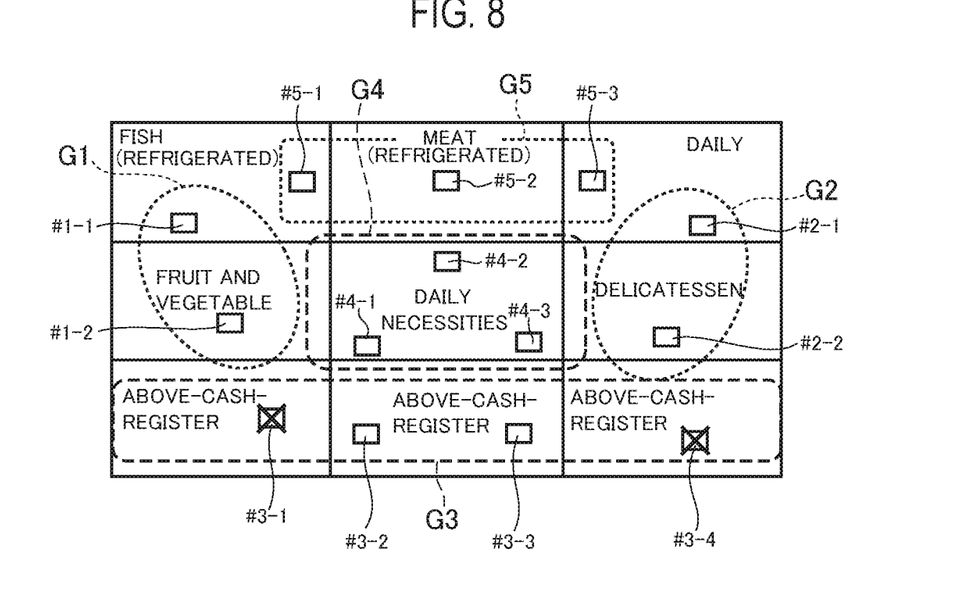
FIG. 8 explains an operation pattern according to the first embodiment.

In one example, a second operation pattern C stops operation of the air conditioners #3-1 and #3-4 (the target equipment to be stopped) during execution of the first operation pattern, as illustrated in FIG. 8. The suspension period of the air conditioners #3-1 and #3-4 may be acquired, as described above, from the equipment management apparatus 50 or from the operation state of the equipment 10 received from the local electric power management apparatus 30.

Figure 9:
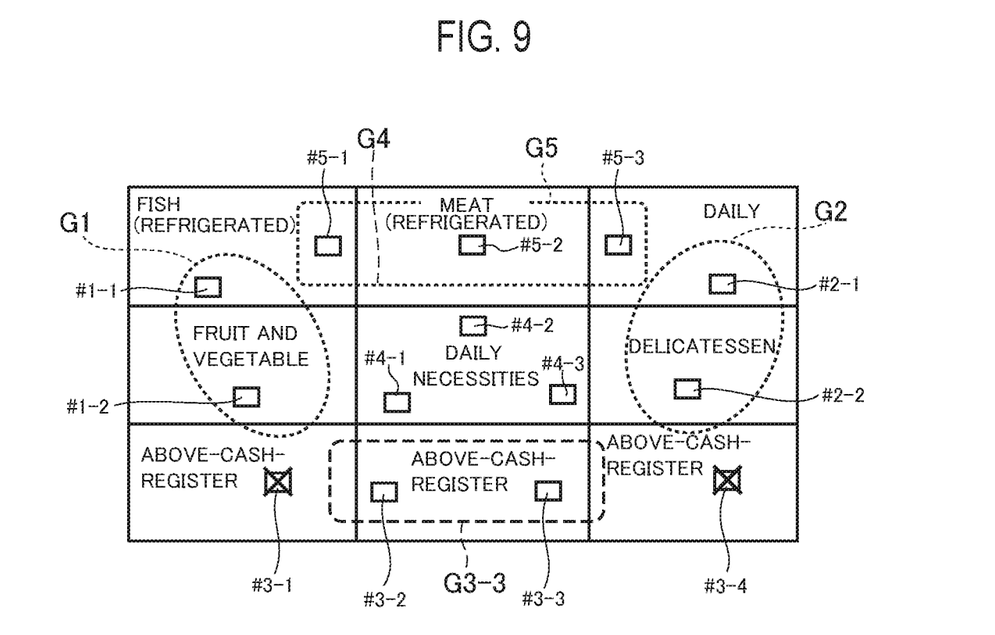
FIG. 9 explains an operation pattern according to the first embodiment.

The server electric power management apparatus 40 identifies the purpose of use (i.e., the above-cash-register area) associated to the air conditioners #3-1 and #3-4. The server electric power management apparatus 40 sets the second operation pattern C for excluding the air conditioners #3-1 and #3-4, which belong to the group G3 including the air conditioners #3-1 and #3-4, from the group G3, as illustrated in FIG. 9, because the air conditioners in the above-cash-register area demand less stringent requirements in the operation result (temperature setting) achieved by the mutual cooperation of the air conditioners. Thus, a new group G3-3 is formed in the second operation pattern C.

The server electric power management apparatus 40 may acquire the information representing the suspension period to stop operation of the air conditioners #3-1 and #3-4, changes the first operation pattern to the second operation pattern C when the suspension period starts, and changes the second operation pattern C to the first operation pattern when the suspension period ends.

(Second Operation Pattern D)

The second operation pattern D turns on the individual air conditioners during sequential control (rotational control) of the air conditioners that belong to the same group. An example of the rotational control of the air conditioners #1 to #3 is described below. FIGS. 10 to 13 are abstractive illustrations of the changes of on and off states of the individual air conditioners in time series. The horizontal axis represents elapse of time. The rectangular waves have Hi and Low representing on-state and off-state, respectively.

Figure 10:
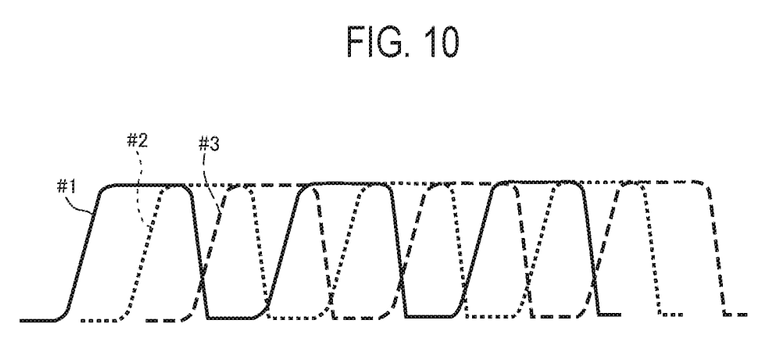
FIG. 10 explains an operation pattern according to the first embodiment.

First, the turn-on period of the air conditioners in the rotational control of the first operation pattern is described by referring to FIG. 10. The server electric power management apparatus 40 sets the turn-on period of the air conditioners #1 to #3 to allow any one of the air conditioners #1 to #3 to be turned on in the first operation pattern, as illustrated in FIG. 10.

Figure 11:
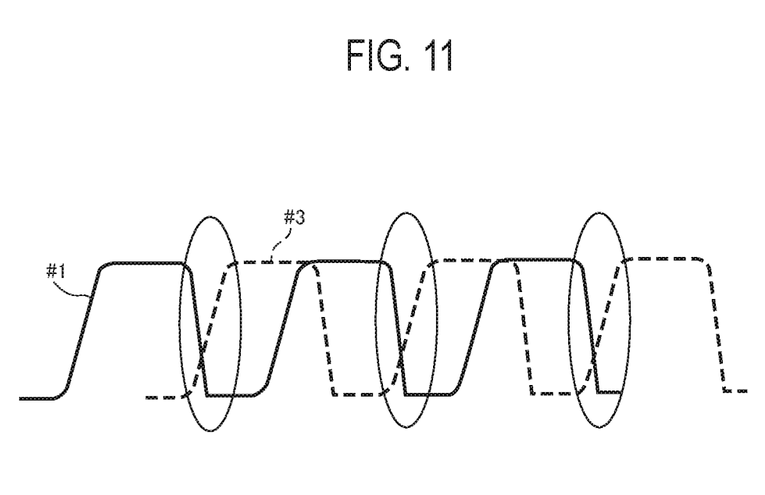
FIG. 11 explains an operation pattern according to the first embodiment.

Secondly, the suspension of operation of the air conditioner #2 during execution of the first operation pattern is described by referring to FIG. 11. When the first operation pattern is not changed, as illustrated in FIG. 11, the air conditioner #2 is simply stopped such that all air conditioners are turned off, although the air conditioners #1 and #3 should have been turned off and the air conditioner #2 should have been turned on at this timing. This state causes a situation in which an overall ability of the air conditioners becomes insufficient.

Figure 12:
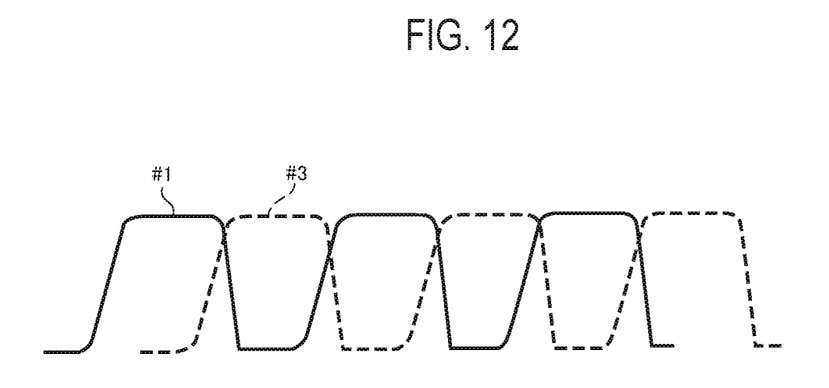
FIG. 12 explains an operation pattern according to the first embodiment.

Thirdly, the first operation pattern switches to the second operation pattern when the air conditioner #2 stops its operation during execution of the first operation pattern. This case is described below by referring to FIG. 12. The server electric power management apparatus 40 sets the second operation pattern D, as illustrated in FIG. 12, so as to compensate for the insufficient ability during the period in which the air conditioner #2 should have been turned on by extending the period for turning on other air conditioners (air conditioners #1 and #3) that belong to the group including the air conditioner #2 (the target equipment to be stopped). In the example illustrated in FIG. 12, the server electric power management apparatus 40 equally extends the period for turning on the air conditioner #1 and the period for turning on the air conditioner #3.

Figure 13:
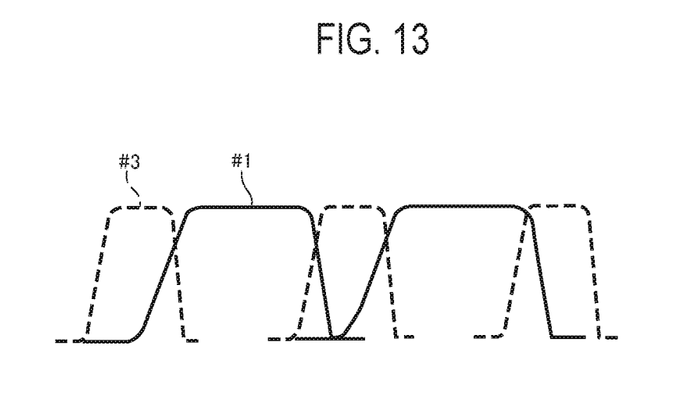
FIG. 13 explains an operation pattern according to the first embodiment.

Fourthly, a modification of the control illustrated in FIG. 12 is described by referring to FIG. 13. In the example illustrated in FIG. 13, the server electric power management apparatus 40 sets the second operation pattern D so as to compensate for the insufficient ability during the period in which the air conditioner #2 should have been turned on by extending the period for turning on the air conditioner #1. In other words, the example illustrated in FIG. 13 extends the period for turning on the air conditioner #1 without changing the period for turning on the air conditioner #3. Alternatively, the period for turning on the air conditioner #3 may be reduced and the period for turning on the air conditioner #1 may be further extended.

For example, the air conditioners of the group G4 (i.e., the air conditioners installed in the daily necessities area), as illustrated in FIG. 5, may extend the period for turning on the air conditioners as illustrated in FIG. 12 or 13. For the air conditioners included in the group G3 (i.e., the air conditioners installed in the above-cash-register area), as illustrated in FIG. 9, the period in which the air conditioners are turned on may not be extended as illustrated in FIG. 11.

The operation of the controller 43 described above may also be understood in the following manner. Specifically, the controller 43 may control pieces of equipment differently between the first and second operation patterns when the pieces of equipment are disposed close to the target equipment to be stopped, as illustrated in the second operation pattern B.

Alternatively, the controller 43 may control pieces of equipment differently between the first and second operation patterns when the pieces of equipment have the same purpose of use (e.g., air conditioning) as the target equipment to be stopped, as illustrated in the second operation patterns A to D.

Alternatively, the controller 43 may set the second operation pattern in accordance with the kind of the sales floor (e.g., daily necessities, meat, or above-cash-register) associated to the target equipment to be stopped in the space including the multiple pieces of equipment, as illustrated in the second operation patterns A to C.

Alternatively, the controller 43 may control pieces of equipment differently between the first and second operation patterns when the pieces of equipment have the same kind of sales floor as the target equipment to be stopped, as illustrated in the second operation patterns A and C.

The controller 43 may change the operation pattern from the first operation pattern to the second operation pattern when any one of the equipment, which should use the first operation pattern, is stopped during the execution of the first operation pattern due to a reason (e.g., malfunction of the target equipment to be controlled, or forcible suspension of the target equipment to be stopped in accordance with the user operation) other than the control of the first operation pattern. Even when the equipment is stopped for the reason other than the control of the first operation pattern, the operation result similar to the operation result to be achieved by the first operation pattern can be achieved by changing the first operation pattern to the second operation pattern.

(Energy Management Method)

Figure 14:
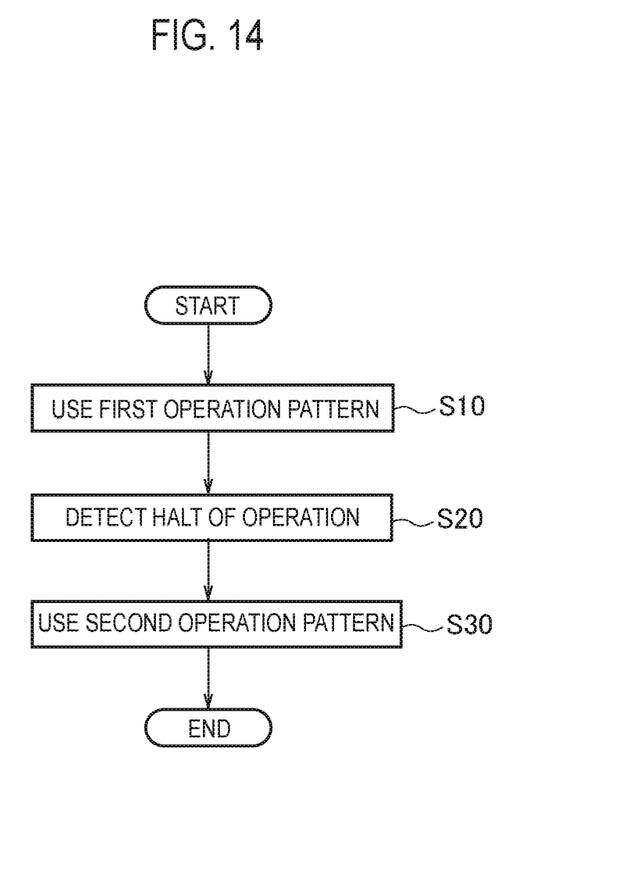
FIG. 14 illustrates an energy management method according to the first embodiment.

An energy management method according to the first embodiment is described below. FIG. 14 illustrates an energy management method according to the first embodiment. FIG. 14 is a flowchart illustrating the process performed by the server electric power management apparatus 40.

In step S10, as illustrated in FIG. 14, the server electric power management apparatus 40 uses the first operation pattern to control the multiple pieces of equipment 10 so as to achieve the desired operation result by mutual cooperation of the pieces of equipment 10. In other words, the server electric power management apparatus 40 instructs the use of the first operation pattern to the multiple pieces of equipment 10.

In step S20, the server electric power management apparatus 40 detects the halt of operation of any one piece of equipment 10 of the multiple pieces of equipment 10. Specifically, the server electric power management apparatus 40 detects the halt of operation of the equipment 10 according to the suspension period acquired from the operation state of the equipment 10 received from either the equipment management apparatus 50 or the local electric power management apparatus 30.

In step S30, the server electric power management apparatus 40 changes the operation pattern to be applied to the multiple pieces of equipment 10 from the first operation pattern to the second operation pattern. The second operation pattern controls, as described above, the equipment 10 other than the target equipment to be stopped so as to achieve an operation result closer to the desired operation result to be achieved by the mutual cooperation of the equipment 10 other than the target equipment to be stopped.

In the first embodiment, the server electric power management apparatus 40 changes the operation pattern from the first operation pattern to the second operation pattern when the target equipment to be stopped is stopped. This avoids the situation where the desired operation result cannot be achieved even when any one of the multiple pieces of equipment is stopped.

Other Embodiments

Although the embodiment of the present invention has been described above, it should not be understood that the description and drawings that constitute part of the above disclosure limit the present invention. Apparently, persons who have ordinary skill in the art would devise various other embodiments, examples, and operational techniques from this disclosure.

The above-described embodiment has been illustrated as an example case of managing the plurality of local electric power management apparatuses 30 intensively by the server electric power management apparatus 40. The embodiment, however, may not be limited to this case. For example, the local electric power management apparatus 30 may change the operation pattern to be used in the multiple pieces of equipment 10 in a self-sustained and distributed manner.

The above embodiment has mainly described about the change of the operation patterns of the air conditioners. The embodiment, however, may not be limited to this case. The change of the operation patterns of the air conditioners may be applied to cooling cases or the like.

Although not mentioned in detail in the embodiment, a storage battery may preferably stop charging before a suspension period, if it is scheduled, for stopping the operation of the storage battery. During the suspension period, the power consumption of the equipment may preferably be reduced to save power to be supplied from the storage battery.

The entire contents of Japanese application No. 2014-4667 (filed on Jan. 14, 2014) has been incorporated into this specification by reference.

INDUSTRIAL APPLICABILITY

The energy management apparatus and the energy management method are provided according to the embodiments. The apparatus and the method avoid the situation where the desired operation result cannot be achieved when one of the equipment is stopped during the mutual cooperation of the multiple pieces of equipment.

The invention claimed is:

1. An energy management apparatus for managing multiple pieces of equipment installed in a consumer facility, comprising:
   a controller configured to control the multiple pieces of equipment by using a first operation pattern to achieve a desired operation result by mutual cooperation of the multiple pieces of equipment, wherein the multiple pieces of equipment are pieces of air conditioning equipment, wherein when a target equipment to be stopped among the multiple pieces of equipment is stopped during the use of the first operation pattern, the controller changes an operation pattern to be used for the control of the multiple pieces of equipment from the first operation pattern to a second operation pattern, the second operation pattern is an operation pattern controlling the multiple pieces of equipment other than the target equipment to be stopped to allow an operation result achieved by the mutual cooperation of the multiple pieces of equipment other than the target equipment to be stopped to approach to the desired operation result, wherein the consumer facility is a store, and the controller sets the second operation pattern in accordance with a purpose of use and a kind of sales floor associated to the target equipment to be stopped in a space where the multiple pieces of equipment are disposed, the controller controls a piece of the equipment from among the multiple pieces of equipment differently between the first operation pattern and the second operation pattern, when the piece of the equipment has the same kind of sales floor as the target equipment to be stopped, so as to compensate for a stop of the target equipment to be stopped, and a sales floor is an area within the consumer facility in which a same type of product is sold.

2. The energy management apparatus according to claim 1, wherein the controller changes the operation pattern from the first operation pattern to the second operation pattern when any one of the equipment, which needs to use the first operation pattern, is stopped during the execution of the first operation pattern because of a reason other than being controlled by the first operation pattern.

3. The energy management apparatus according to claim 1, wherein the controller sets the second operation pattern in accordance with a position of the target equipment to be stopped in a space where the multiple pieces of equipment are disposed.

4. The energy management apparatus according to claim 3, wherein the controller controls the piece of the equipment from among the multiple pieces of equipment differently between the first operation pattern and the second operation pattern, the piece of the equipment being disposed close to the target equipment to be stopped.

5. The energy management apparatus according to claim 1, wherein the controller controls the piece of the equipment from among the multiple pieces of equipment differently between the first operation pattern and the second operation pattern, the piece of the equipment being disposed close to the target equipment to be stopped.

6. The energy management apparatus according to claim 1, wherein the controller controls the piece of the equipment from among the multiple pieces of equipment differently between the first operation pattern and the second operation pattern, the piece of the equipment having the same use as the target equipment to be stopped.

7. The energy management apparatus according to claim 1, wherein the controller acquires information representing a suspension period in which the target equipment to be stopped is stopped, and changes the first operation pattern to the second operation pattern during the suspension period.

8. The energy management apparatus according to claim 2, wherein the controller acquires information representing a suspension period in which the target equipment to be stopped is stopped, and changes the first operation pattern to the second operation pattern during the suspension period.

9. The energy management apparatus according to claim 3, wherein the controller acquires information representing a suspension period in which the target equipment to be stopped is stopped, and changes the first operation pattern to the second operation pattern during the suspension period.

10. The energy management apparatus according to claim 4, wherein the controller acquires information representing a suspension period in which the target equipment to be stopped is stopped, and changes the first operation pattern to the second operation pattern during the suspension period.

11. An energy management method for managing multiple pieces of equipment installed in a consumer facility, comprising:

a step α of controlling the multiple pieces of equipment by using a first operation pattern to achieve a desired operation result by mutual cooperation of the multiple pieces of equipment, wherein the multiple pieces of equipment are pieces of air conditioning equipment, and a step β of changing an operation pattern to be used in controlling the multiple pieces of equipment from the first operation pattern to a second operation pattern, when a target equipment to be stopped among the multiple pieces of equipment is stopped during the use of the first operation pattern, wherein the second operation pattern controlling the multiple pieces of equipment other than the target equipment to be stopped to allow an operation result achieved by the mutual cooperation of the equipment other than the target equipment to be stopped to approach to the desired operation result, wherein the consumer facility is a store, and the controller sets the second operation pattern in accordance with a purpose of use and a kind of sales floor associated to the target equipment to be stopped in a space where the multiple pieces of equipment are disposed, the second operation pattern controlling a piece of the equipment from among the multiple pieces of equipment differently than the first operation pattern, when the piece of the equipment has the same kind of sales floor as the target equipment to be stopped, so as to compensate for a stop of the target equipment to be stopped, a sales floor being an area within the consumer facility in which a same type of product is sold.

* * * * *